United States Patent [19]
Wada et al.

[11] Patent Number: 5,299,650
[45] Date of Patent: Apr. 5, 1994

[54] MOTOR-DRIVEN POWER STEERING APPARATUS AND METHOD

[75] Inventors: Shunichi Wada; Yasuo Naito, both of Himeji, Japan

[73] Assignee: Mitsubishi Denki Kabushiki Kaisha, Tokyo, Japan

[21] Appl. No.: 945,405

[22] Filed: Sep. 16, 1992

[30] Foreign Application Priority Data

Sep. 18, 1991 [JP] Japan .................. 3-238236

[51] Int. Cl.$^5$ .................................................. B62D 5/04
[52] U.S. Cl. .......................... 180/79.1; 364/424.05
[58] Field of Search ............... 280/79.1; 364/424.05; 180/142, 143

[56] References Cited

U.S. PATENT DOCUMENTS

| | | | |
|---|---|---|---|
| 4,573,545 | 3/1986 | Kalns | 180/79.1 |
| 4,849,889 | 7/1989 | Morishita et al. | 364/424.05 |
| 4,926,960 | 5/1990 | Ishikura et al. | 180/142 |
| 4,940,102 | 7/1990 | Morishita | 180/79.1 |
| 4,984,647 | 1/1991 | Morishita et al. | 180/79.1 |
| 5,027,276 | 6/1991 | Morishita et al. | 180/79.1 |
| 5,040,630 | 8/1991 | Morishita et al. | 180/79.1 |
| 5,082,076 | 1/1992 | Oshita et al. | 180/79.1 |

FOREIGN PATENT DOCUMENTS

| | | |
|---|---|---|
| 0233012 | 8/1987 | European Pat. Off. |
| 0238348 | 9/1987 | European Pat. Off. |
| 114574 | 5/1989 | Japan .................. 180/79.1 |
| 2186242 | 8/1987 | United Kingdom. |
| 2233293 | 1/1991 | United Kingdom ........... 180/79.1 |

Primary Examiner—Richard M. Camby
Assistant Examiner—Kevin Hurley
Attorney, Agent, or Firm—Sughrue, Mion, Zinn, Macpeak & Seas

[57] ABSTRACT

A motor-driven power steering apparatus and method for a vehicle are able to avoid frequent on-off operations of an electromagnetic clutch 14 as much as possible, which connects or disconnects a motor 13 with or from a steering system, thus improving the durability of the clutch 14 and suppressing the generation of undesirable noise and shocks upon connection and disconnection of the clutch 14. The motor 13 is deenergized by a motor controller 191 when the vehicle speed V is equal to or greater than a predetermined value Vo. The clutch 14 is turned off to disconnect the motor from the steering system when an abnormality in the steering system is determined during high speed travel of the vehicle. Such an abnormality is determined if the motor current flowing through the deenergized motor is not equal to zero, or if the steering torque is equal to or greater than a predetermined value and a voltage across the motor when deenergized is equal to zero, or if the rotational speed of the steering wheel is equal to or greater than a predetermined value and the motor voltage is equal to zero.

6 Claims, 6 Drawing Sheets

(a) CLUTCH CONTROL SIGNAL C (b) CALCULATED MOTOR CURRENT LEVEL Io

MOTOR-DRIVEN POWER STEERING APPARATUS AND METHOD

BACKGROUND OF THE INVENTION

This invention relates to a motor-driven power steering apparatus and method for a vehicle in which a motor is operatively connected with steerable road wheels of the vehicle through a clutch for assisting the steering operation of the driver. More particularly, it relates to such an apparatus and a method as described in which the clutch is turned off to disconnect the motor from the steerable road wheels only when an abnormality in the power steering operation is detected when the vehicle is travelling at high speeds.

FIG. 4 is a schematic representation of a conventional motor-driven power steering apparatus as described in Japanese Patent Laid-Open No. 62-255273 or Japanese Patent Laid-Open No. 63-215461.

Referring to the figure, designated at reference numeral 1 is a steering wheel which is turned by the driver of a vehicle for steering operation. A steering shaft or column, generally designated at 2, serves to transmit torque imparted by the driver to the steering wheel 1 toward steerable road wheels (not shown) through a pinion and rack mechanism. The steering shaft 2 includes a first shaft section 2a which is connected at its upper end with the steering wheel 1, and a second shaft section 2b which is connected at its upper end via a universal joint 4a with the first shaft section 2a. A steering torque sensor 3 is mounted on the steering shaft 2 for sensing the steering torque T of the steering wheel 1. The pinion and rack mechanism includes a first pinion shaft 5 which is connected via a universal joint 4b with a lower end of the second shaft section 2b of the steering shaft 2, and a rack rod 6 which is connected at its opposite ends with the unillustrated steerable road wheels and which has a first threaded portion 6a engaged with the first pinion shaft 5, and a second threaded portion 6b. The elements 1 through 6 together constitute a steering system.

A vehicle speed sensor 10 senses the speed V of the vehicle at which the vehicle is travelling, and generates a corresponding output signal to a control unit 9. The control unit 9 includes a microcomputer for controlling a motor 13 in the form of a DC motor and a clutch 14 in the form of an electromagnetic clutch based on the steering torque T and the vehicle speed V as sensed by the steering torque sensor 3 and the vehicle speed sensor 10 so as to properly perform power assist for steering. A battery 11 mounted in the vehicle is directly connected to the control unit 9 for supplying power thereto, and it is also connected through a key switch 12 and the control unit 9 to the motor 13 and a clutch 14 to be described later for energizing them, the key switch 12 being connected between the battery 11 and the control unit 9. The motor 13 has an unillustrated rotating shaft which is connected via the clutch 14 with a worm shaft 15 which is in meshing engagement with a worm wheel 16. The worm wheel 16 is connected with a second pinion shaft 18 which is engaged with the second threaded portion 6b of the rack rod 6. The worm shaft 15 and the worm wheel 16 together constitute a speed reduction mechanism for transmitting the output torque of the motor 13 to the rack rod 6 at a reduced speed for power assist.

FIG. 5 is a block diagram showing the detailed construction of the control unit 9 of the conventional power steering apparatus of FIG. 4. The control unit 9 includes a motor control means 91 for calculating a motor current Io to be supplied to the motor 13 based on the steering torque T and the vehicle speed V and for driving the motor 13, and a clutch control means 92 for supplying a clutch control signal or current C to the electromagnetic clutch 14 to control it such that the clutch 14 is switched off into a disconnected state when the vehicle speed V is equal to and above a predetermined speed Vo (for instance 50 km/hr.), and switched on into a connected state when the vehicle speed V is below the predetermined speed Vo, and a motor current sensing means 93 in the form of a grounded resistor for sensing an actual motor current I flowing through the motor 13 and feeding data thereof back to the motor control means 91.

The motor control means 91, while being fed back with the motor current I sensed by the current sensing resistor 93, applies a voltage to the motor 13 such that a current corresponding to the calculated motor current Io is supplied from the battery 11 to the motor 13 via the control unit 9. When the clutch control means 92 determines a failure or abnormality in the power steering apparatus on the basis of signals output from the various sensors when the vehicle is travelling at low speeds less than the predetermined speed Vo, the clutch control signal or current C is made to a low level to turn off the clutch.

FIG. 6 is a graph showing the clutch control signal C and the calculated motor current Io. As shown at (a) in FIG. 6, the clutch control signal C is "on" or at a high level (e.g., indicative of a clutch current of about 1 ampere) when the vehicle speed V is lower than the predetermined vehicle speed Vo and it is "off" or at a low level (e.g., indicative of a clutch current of 0 ampere) when the vehicle speed V is the predetermined vehicle speed Vo or above.

As shown at (b) in FIG. 6, the calculated motor current level Io increases with the decreasing vehicle speed V and also with the increasing steering torque T when the vehicle speed V is lower than the predetermined vehicle speed Vo, and it is equal to zero when the vehicle speed V is the predetermined vehicle speed Vo or above. Usually, the steering wheel 1 is heavy to turn (i.e., a greater steering torque is required to turn the steering wheel 1) during low speed travel, whereas it is light (i.e., a smaller steering torque is required) during high speed travel irrespective of the road and other conditions. Accordingly, the auxiliary torque or power assist by the motor 13 should be increased with a decrease in the vehicle speed V.

The operation of the conventional motor-driven power steering apparatus shown in FIGS. 4 and 5 will now be described with reference to FIG. 6.

When the vehicle speed V is lower than the predetermined vehicle speed Vo during low speed travel, the clutch control means 92 in the control unit 9 makes the clutch control signal C to a high level to turn the electromagnetic clutch 14 on into a connected state. The motor control means 91 generates a motor current signal Io based on the vehicle speed V from the vehicle speed sensor 10 and the steering torque T from the torque sensor 3 thereby cause the motor 13 to generate a necessary torque for power steering.

More specifically, with a reduction in the vehicle speed V, the required steering torque T increases, so the motor current level Io corresponding to the output torque of the motor 13 is thus set to an increased level in accordance with the decreasing vehicle speed. When the required steering torque increases due to some cause such as a change in the road condition or the like, the motor current level Io is set to a value corresponding to the increased level of the steering torque T.

Thus, the amount of steering torque or force required of the driver can be held substantially constant irrespective of the driving condition or the like.

When a system failure or abnormality is detected during low speed travel, the clutch control means 92 makes the clutch control signal C to a low level to turn the electromagnetic clutch 14 off, so that the motor 13 is disconnected from the worm shaft 15 to ensure safety in steering. For example, a system failure or abnormality is determined in such a case as when the motor current level Io as calculated by the motor control means 91 or the motor current I as sensed through the current sensing resistor 93 is of an abnormally high value, or when the output of the torque sensor 3 shows that the steering wheel 1 has not been operated by the driver for an unusually long period of time.

During high speed travel in which the vehicle speed V is greater than the predetermined vehicle speed Vo, the clutch control means 92 makes the clutch control signal C to a low level to turn the electromagnetic clutch 14 off, thereby disconnecting the motor 13 from the worm shaft 15. At the same time, the motor control means 91 operates to stop or interrupt the power supply from the battery 11 to the motor 13 via the key switch 12, and hence the motor 13 is stopped. In this situation, even if a system failure such as an abnormality or malfunction in the motor 13, the sensors 3, 10 or the like takes place during high speed travel in which the electromagnetic clutch 14 is turned off to disconnect the motor 13 from the rack rod 6, there will be no trouble or problem in the manual steering operation of the driver.

Subsequently, when the vehicle speed V decreases below the predetermined value Vo, the clutch control signal C from the clutch control means 92 becomes high again to turn on the electromagnetic clutch 14, and the motor control means 91 controls the motor current I on the basis of the vehicle speed V and the steering torque T as noted above.

Generally, in the event of a failure of the control unit 9, an improper motor current level Io can be supplied to the motor 13, thus causing undesirable forced rotation of the steering wheel 1 without regard to the driver's steering effort. In addition, in the event of a mechanical failure of the motor 13 with the clutch 14 held in a connected state, it becomes difficult for the driver to turn the steering wheel 1, that is, the state of incapability of steering results. Although the driver can deal with these failures by turning the clutch off during low speed travel, it is extremely difficult to well cope with them during high speed travel, thus spoiling safety in driving as is well known in the art.

Accordingly, to avoid the above-described situations, when the vehicle speed V exceeds the predetermined vehicle speed Vo, the clutch control signal C is made to a low level to provide for fail-safe operation and hence safe driving.

To summarize, as described above, with the above-mentioned conventional motor-driven power steering apparatus, the electromagnetic clutch 14 is normally connected, but disconnected only when a system failure is determined during low speed driving, whereas it is always disconnected during high speed driving irrespective of any system failure.

Therefore, each time the vehicle speed V decreases below or increases above the predetermined vehicle speed Vo, the electromagnetic clutch 14 is operated to turn on and off. Such frequent on-off operations of the clutch 14 produce great sounds, thus resulting in increased noise and an uncomfortable ride. In addition, the durability of the electromagnetic clutch 14 is accordingly reduced. Further, upon the electromagnetic clutch 14 being turned on and off, the driver gripping the steering wheel 1 is frequently subject to undesirable steering shocks.

SUMMARY OF THE INVENTION

Accordingly, the present invention is intended to solve the above-described problems encountered with the conventional motor-driven power steering apparatus.

An object of the invention is to provide an apparatus and a method for motor-driven power steering control in which a clutch is normally turned on to connect a motor with a steering system but turned off to disconnect it therefrom upon detection of a system failure or abnormality during high speed travel, thus improving the durability of the clutch without spoiling the safety in driving as well as suppressing the generation of noise and shocks due to frequent on-off operations of the clutch.

To attain the above object, according to one aspect of the present invention, there is provided a motor-driven power steering apparatus for a vehicle comprising: a steering system transmitting a steering force applied to a steering wheel to steerable road wheels of the vehicle; a vehicle speed sensor for sensing the speed of the vehicle at which the vehicle is travelling; a torque sensor for sensing a steering torque applied to the steering system; a steering speed sensor for sensing a steering speed at which the steering wheel is turned by the driver; a motor coupled via a clutch to the steering system for generating an assisting torque which assists a driver's induced steering motion of the steering system; motor current sensing means for sensing a motor current flowing through the motor; motor voltage sensing means for sensing a motor voltage across the motor; motor control means for controlling a current supplied to the motor based on the vehicle speed and the steering torque in such a manner that it makes the current supplied to the motor to zero when the vehicle speed is equal to or greater than a predetermined vehicle speed; clutch control means for turning the clutch on and off based on the steering torque, the vehicle speed, the steering speed and the motor voltage in such a manner that it turns the clutch off to disconnect the motor from the steering system when it determines a system failure during high speed travel of the vehicle at which the vehicle is travelling at a speed equal to or higher than the predetermined vehicle speed.

The clutch control means determines a system failure if a current flowing through the motor when deenergized is not equal to zero, or if the steering torque or a rate of change thereof is equal to or greater than a predetermined value and if the motor voltage across the motor when deenergized is equal to zero, or if the steering speed is equal to or greater than a predetermined value and if the motor voltage across the motor when deenergized is equal to zero.

According to another aspect of the invention, there is provided a method for controlling a motor-driven power steering apparatus for a vehicle in which a motor is coupled via a clutch to a steering system having a steering wheel for generating an assisting torque to assist a steering motion of the steering system induced by a driver of the vehicle. The method comprises the steps of; determining whether a speed of the vehicle is equal to or greater than a predetermined vehicle speed; deenergizing the motor with the clutch held in a connected state when the vehicle speed is equal to or greater than the predetermined vehicle speed; determining whether there is a system failure; and turning the clutch off to disconnect the motor from the steering system if there is a system failure.

The determination of a system failure is carried out by the steps of: detecting whether a motor current flowing through the motor when deenergized is equal to zero; detecting whether a steering motion is given to the steering wheel by the driver when the motor current is equal to zero; detecting whether a motor voltage across the motor when deenergized is equal to zero when a steering motion is given to the steering wheel by the driver; and determining a system failure if the motor current flowing through the motor when deenergized is not equal to zero, or if the motor voltage across the motor when deenergized is equal to zero when a steering motion is given to the steering wheel by the driver and when the motor current through the motor when deenergized is equal to zero.

In one form, if the steering torque applied to the steering wheel by the driver or a rate of change thereof is equal to or greater than a predetermined value, it is determined that a steering motion is given to the steering system.

In another form, if a steering speed of the steering wheel is equal to or greater than a predetermined value, it is determined that a steering motion is given to the steering system.

According to the invention, when the vehicle is travelling at high speeds, a system failure can be reliably determined on the basis of the motor current and the motor voltage during steering in the deenergized state of the motor, and only upon detection of such a system failure, the clutch is turned off to disconnect the motor from the steering system. As a result, frequent on-off operations of the clutch can be avoided.

The above and other objects, features and disadvantages of the invention will become more readily apparent from the following detailed description of a preferred embodiment of the invention when read with reference to the accompanying drawings.

BRIEF DESCRIPTION OF THE DRAWINGS

In the drawings, the same or corresponding parts are identified by the same symbols.

DETAILED DESCRIPTION OF THE PREFERRED EMBODIMENT

Figure 1:
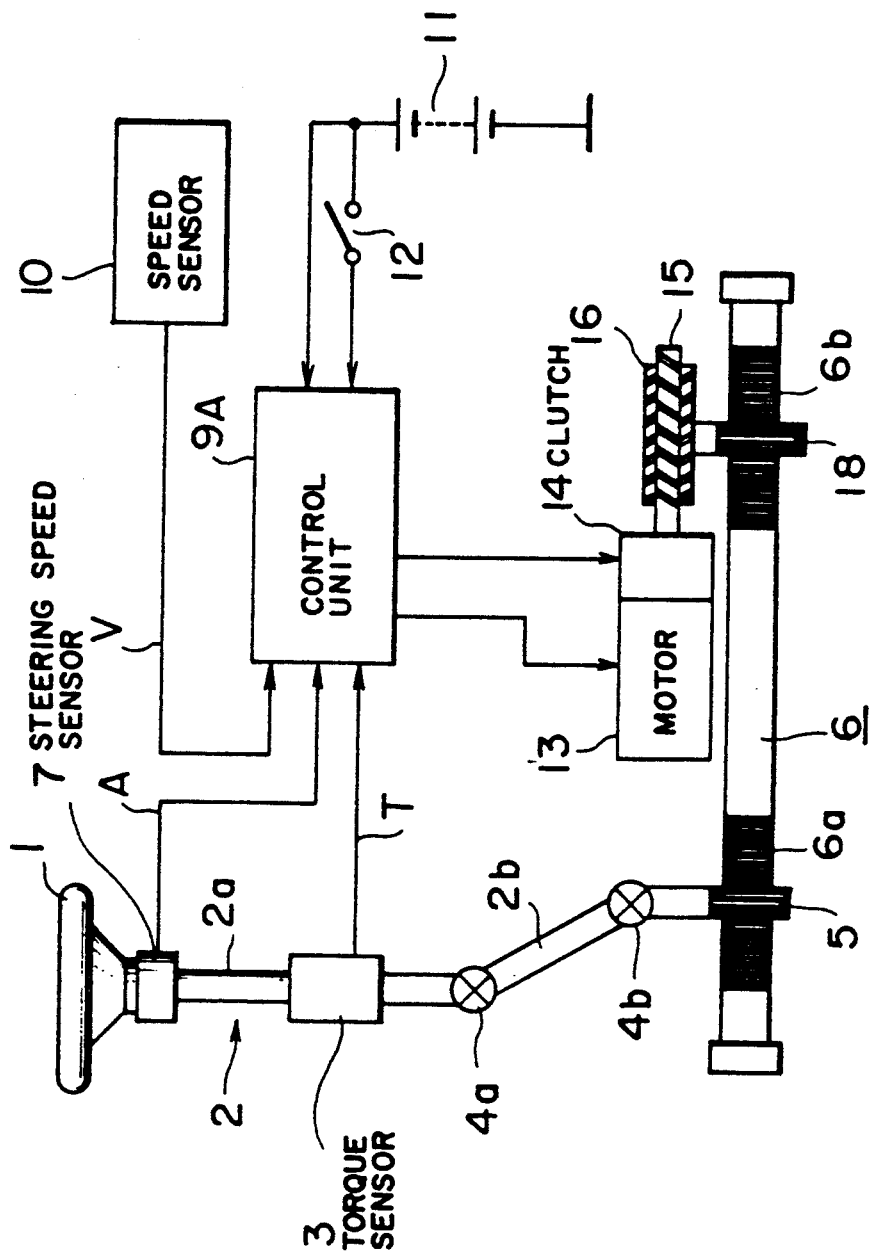
FIG. 1 is a schematic block diagram showing the general arrangement of a motor-driven power steering apparatus in accordance with the present invention.
Figure 2:
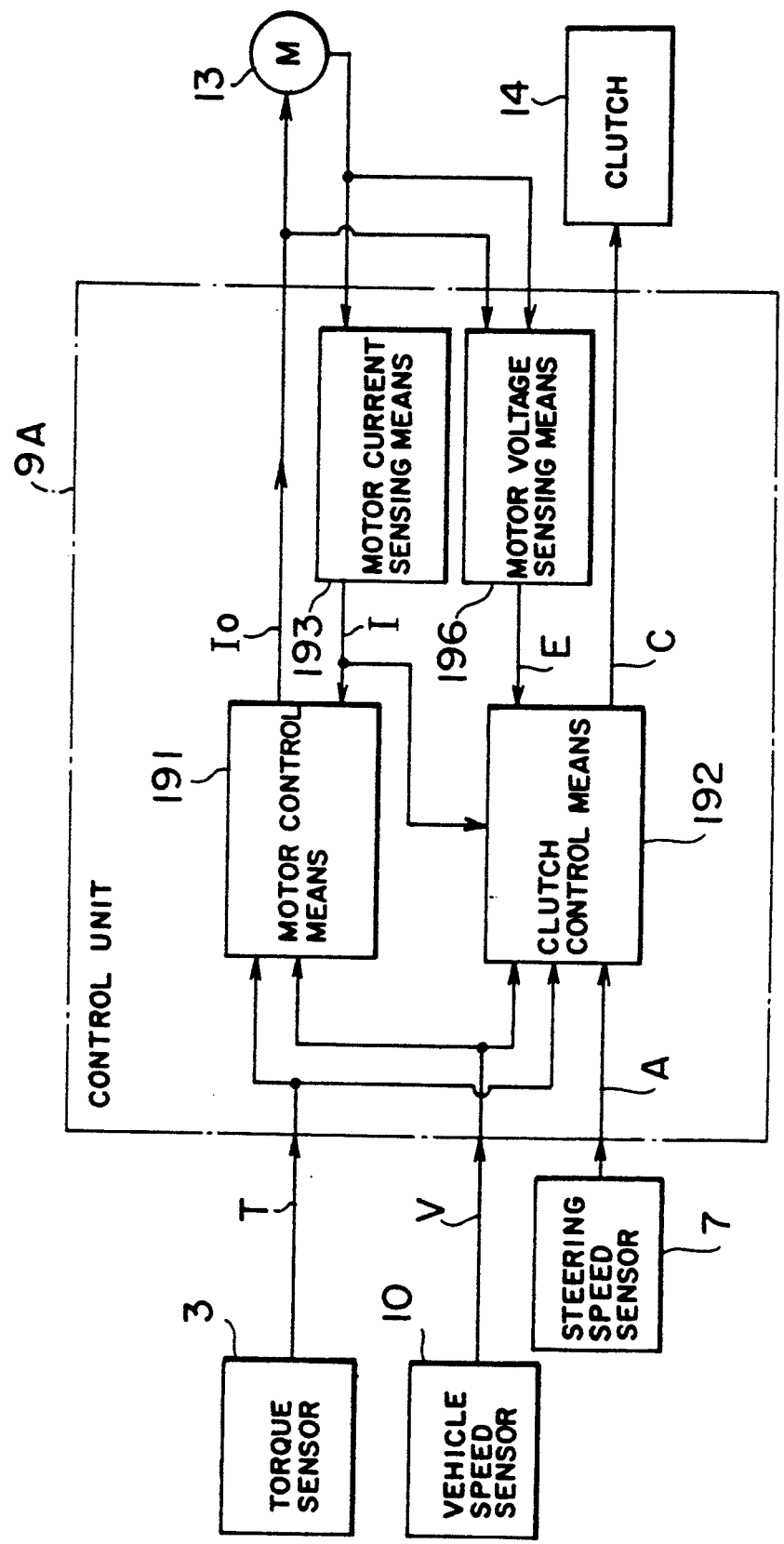
FIG. 2 is a block diagram showing the construction of a control unit and its associated parts shown in FIG. 1.

A preferred embodiment of the invention will now be described with reference to the drawings. FIG. 1 diagrammatically illustrates the general arrangement of a motor-driven power steering apparatus having a control unit 9A constructed in accordance with the present invention. FIG. 2 illustrates the detailed construction of the control unit 9A and its associated parts of FIG. 1. In FIG. 1, elements 1, 2, 2a, 2b, 4a, 4b, 5, 6, 6a, 6b, 10, 11, 12, 13, 14, 15, 16, and 18 are the same as those employed and described before with reference to the conventional motor-driven power steering apparatus illustrated in FIGS. 4 and 5. In addition to these elements, a steering speed sensor 7 is mounted on an upper portion of the steering shaft 2 for sensing the steering or rotational speed A of the steering wheel 1 and generating a corresponding output signal A to the control unit 9A, which is different in construction and operation from the control unit 9 of FIGS. 4 and 5.

As clearly shown in FIG. 2, the control unit 9A includes a motor control means 191 for calculating a motor current Io to be supplied to the motor 13 based on the steering torque T and the vehicle speed V and for supplying the thus calculated motor current Io from the battery 11 to the motor 13 in a feedback manner, as in the case of the motor control means 91 of the conventional control means 9, and a clutch control means 192 for determining a system failure based on output signals from various sensors 3, 7, 10 and the like and for controlling the clutch 14 in the form of an electromagnetic clutch to turn it on and off.

A motor current sensing means 193 senses a motor current actually flowing through the motor 13 and generates a corresponding output signal I to the motor control means 191 and to the clutch control means 192. A motor voltage sensing means 196 senses a motor voltage E across the motor 13 and generates a corresponding output signal E to the clutch control means 192.

The motor control means 191 controls the motor current in such a manner that it makes the current supplied to the motor 13 zero when the vehicle speed V is equal to or greater than a predetermined vehicle speed Vo. The clutch control means 192 turns the clutch 14 off to disconnect the motor 13 from the steering system when it determines a system failure during high speed travel of the vehicle at which the vehicle is travelling at a speed equal to or higher than the predetermined vehicle speed Vo. The clutch control means 192 determines a system failure if a current I flowing through the motor 13 when deenergized is not equal to zero, or if the steering torque T or a rate of change δT thereof is equal to or greater than a predetermined value To and if the motor voltage E across the motor 13 when deenergized is equal to zero, or if the steering speed A is equal to or greater than a predetermined value Ao and if the motor voltage E across the motor 13 when deenergized is equal to zero.

Figure 3:
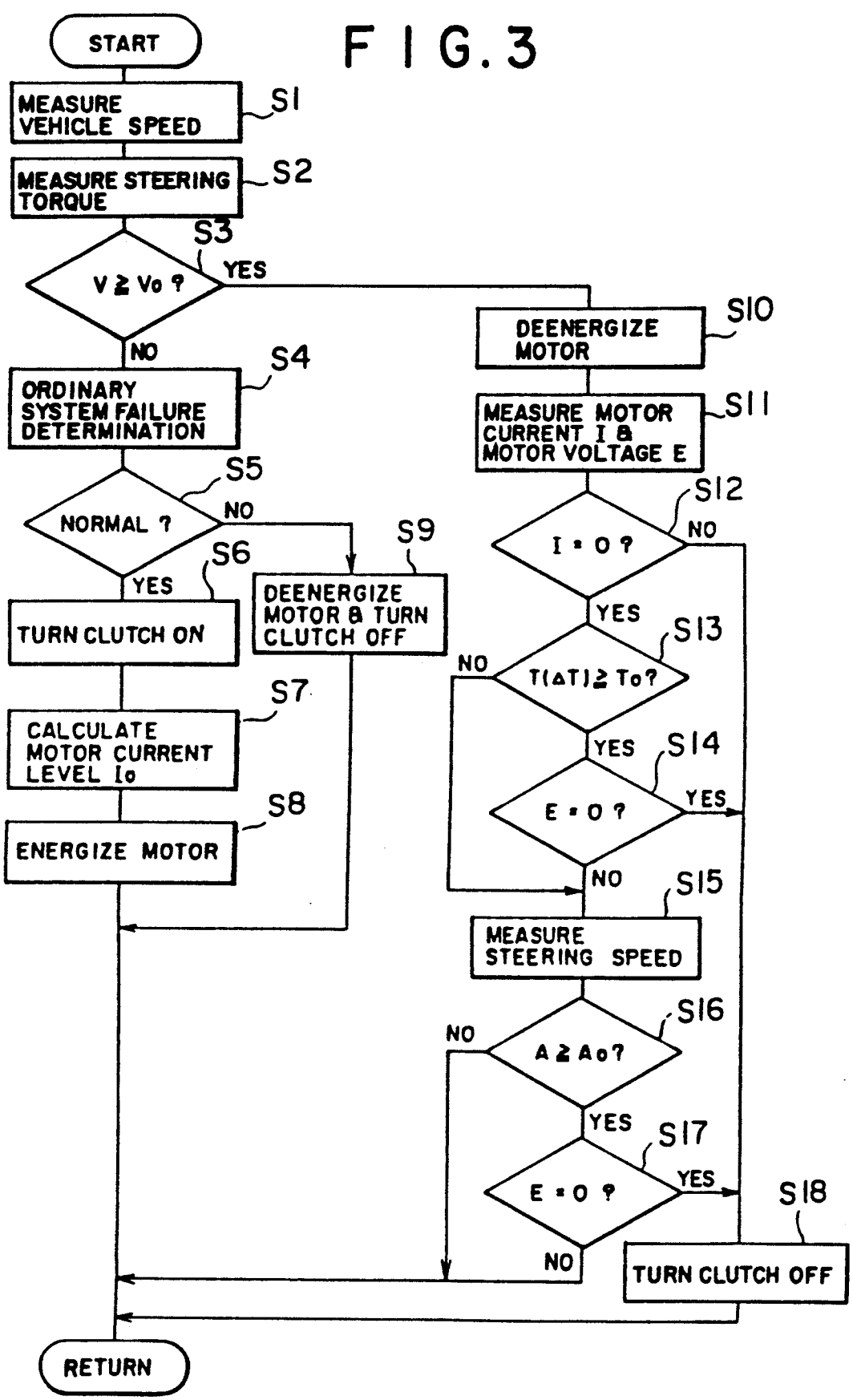
FIG. 3 is a flow chart illustrating a method or operation performed by the control unit of FIG. 2 for controlling the motor-driven power steering apparatus of FIG. 1.

Now, the operation of the above embodiment shown in FIGS. 1 and 2 will be described below with reference to the flow chart of FIG. 3.

First, the vehicle speed V and steering torque T are measured in Steps S1 and S2, respectively, and then in Step S3, a check is done as to whether the vehicle speed V is equal to or above a predetermined value Vo (i.e., it is determined whether the vehicle is in high speed driving).

Figure 4:
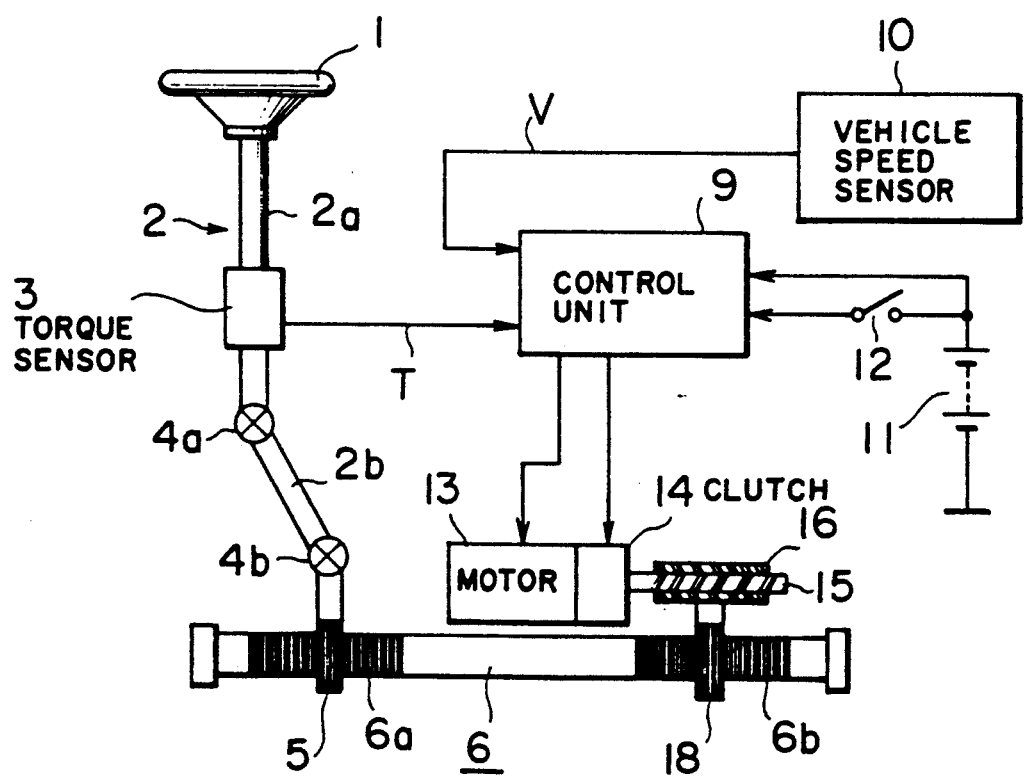
FIG. 4 is a schematic view showing the general arrangement of a conventional motor-driven power steering apparatus.
Figure 5:
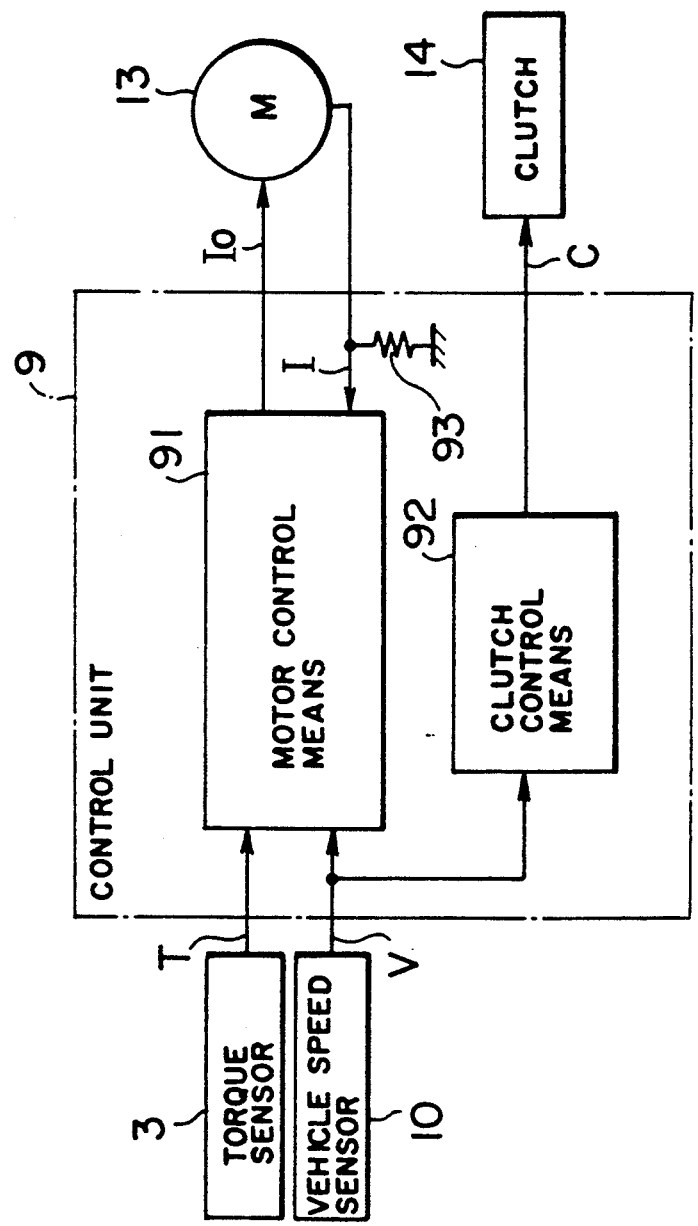
FIG. 5 is a block diagram showing the construction of the conventional control unit shown in FIG. 1.
Figure 6:
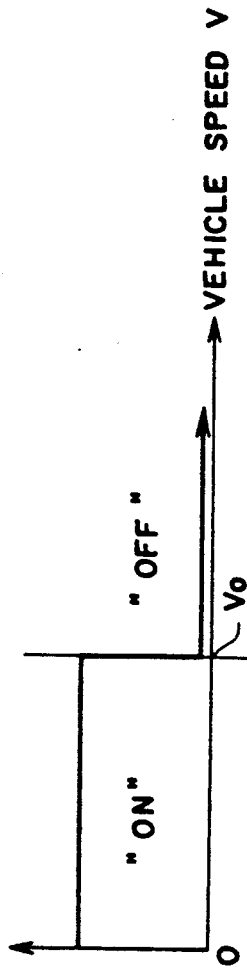
FIG. 6 is a graph illustrating the operation of the conventional control unit of FIG. 5.
Figure 6:
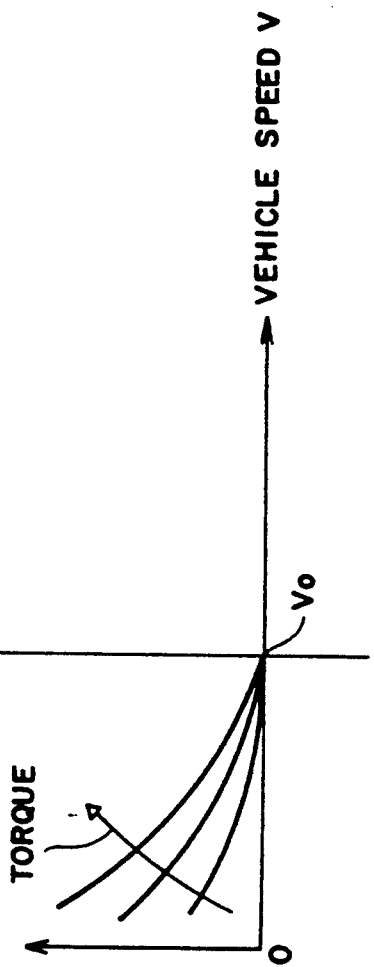

If the vehicle speed V is lower than the predetermined value Vo (i.e., V<Vo), the control process then goes to a usual system failure determining Step S4, and a system failure is thereafter determined, as in the above-mentioned conventional apparatus of FIGS. 4 and 5.

That is, in Step S5, it is determined whether the system or apparatus is normal. If the answer is positive (i.e., the system is normal), then in Step S6, the electromagnetic clutch 14 is turned on. Subsequently, in Step S7, a motor current level Io is calculated, and in Step S8, a current of the thus calculated level Io is supplied from the battery 11 to the motor 13 through the control unit 9A. Thereafter, a return is performed.

If, however, it is determined in Step S5 that there is a system failure, the control process goes to Step S9 where the motor current level Io to be supplied to the motor 13 is changed to zero to deenergize it, and at the same time, the output C of the clutch control means 192 is made to a low level to turn off the electromagnetic clutch 14. Thereafter, a return is carried out.

On the other hand, if it is determined in Step S3 that the vehicle speed V is equal to or greater than the predetermined value Vo, the control process goes to Step S10 where the motor current level Io is changed to zero to deenergize the motor 13.

Subsequently, in Step S11, a motor current I actually flowing through the motor 13 as well as a motor voltage E across the motor 13 are sensed by the motor current sensing means 193 and the motor voltage sensing means 196, respectively.

In this connection, it is to be noted that if the motor control means 191 is normal at this time, the actual motor current I flowing through the deenergized motor 13 becomes zero. If, however, the motor current level Io is abnormal, the sensed motor current I does not become zero. If the motor 13 is normal, during steering, i.e., when the steering wheel 1 is turned by the driver, the motor 13 is forcibly energized, thus generating a voltage E thereacross. If, however, the motor 13 is abnormal or in failure, the motor voltage E becomes zero.

Accordingly, in Step S12, a check is done as to whether the motor current I sensed by the motor current sensing means 196 is equal to zero. If so, then in Step S13, it is determined that the motor control means 191 is normal, and a check is done as to whether the steering torque T of the steering system as sensed by the torque sensor 3 or a rate of change δT of the steering torque T is equal to or greater than a predetermined value To. If the answer to this question is positive, then in Step S14 it is determined whether the motor voltage E is equal to zero. If the motor voltage E is not equal to zero, then in Step S15, the steering speed A (i.e., the rotational speed of the steering wheel 1) is measured, and in Step S16, a check is done as to whether the steering speed A is equal to or greater than a predetermined level Ao.

In addition, if the steering speed A is equal to or greater than the predetermined level Ao, then in Step S17, a check is again done as to whether the motor voltage E is equal to zero. If the motor voltage E is not equal to zero, it is determined that the motor 13 is normal, and thereafter a return is performed.

If it is determined in Step S13 that the steering torque T is lower than the predetermined level To, the control process jumps to Step S15 while skipping Step S14. If in Step S16 it is determined that the steering speed A is lower than the predetermined level Ao, a return is carried out while skipping Step S17.

On the other hand, if it is determined in Step S12 that the motor current I is not equal to zero, or if it is determined in Step S14 or S17 that the motor voltage E is equal to zero, the clutch 14 is turned off into a disconnected state in Step S18.

As described above, when the vehicle is travelling at high speeds equal to or greater than the predetermined value Vo, the motor current I is made to zero with the motor 13 held connected to the steering system through the electromagnetic clutch 14 while making a check as to whether the motor voltage E is present upon detection of abnormally high levels of the steering torque T (or the change rate δT of the steering torque) and the steering speed A in the non-energized state of the motor 13. In this manner, a system failure during the high speed driving can be easily and reliably determined without spoiling the safety in driving. If no system failure is determined, the electromagnetic clutch 14 is not turned off but held turned on, and when the low speed driving range is restored from the high speed one (i.e., the vehicle speed V decreases below the predetermined value Vo), the electromagnetic clutch 14 continuously remains "on". That is, in this case, no on-off operation of the clutch 14 takes place.

Further, even if the steering torque T is equal to or greater than the predetermined level To in Step S13, or if the steering speed A is equal to or greater than the predetermined level Ao in Step S16, an abnormality or failure of the motor 13 is not immediately determined but further checks are done in Steps S14 and S17 as to whether a motor voltage E has been generated. Thus, reliability in the abnormality determination can be improved. Further, in cases where the steering torque T or the steering speed A is large due to certain driving conditions of the vehicle but not because of a system abnormality or failure, the apparatus is determined to be normal so long as a motor voltage E greater than zero is developed across the motor 13, thus avoiding erroneous abnormality determinations.

On the other hand, if it is determined in step S12 that the motor current I is not equal to zero or if it is determined in Step S14 or S17 that the motor voltage E during steering is equal to zero, a system failure or abnormality (i.e., a failure or abnormality of the motor control means 191 or the motor 13) is determined. Thus, in this case, the electromagnetic clutch 14 is turned off to disconnect the motor 13 from the steering system in Step S18.

The electromagnetic clutch 14, which is thus turned off during high speed travel, of course remains "off" even when the low speed driving range, at which the vehicle speed V is lower than the predetermined value Vo, is restored.

In the above embodiment, a check as to whether steering is effected during high speed driving is done based on the steering torque T and the steering speed A in Steps S13 and S16. However, it is possible as well to use only either one of the steering torque T and the steering speed A.

What is claimed is:

1. A motor-driven power steering apparatus for a vehicle comprising:

a steering system transmitting a steering force applied to a steering wheel by a driver of the vehicle to steerable road wheels of the vehicle;

a vehicle speed sensor for sensing the speed of the vehicle at which the vehicle is travelling;

a torque sensor for sensing a steering torque applied to said steering system;

a steering speed sensor for sensing a steering speed at which said steering wheel is turned by the driver;

a motor coupled via a clutch to said steering system for generating an assisting torque which assists a driver's induced steering motion of said steering system;

motor current sensing means for sensing a motor current flowing through said motor;

motor voltage sensing means for sensing a motor voltage across said motor;

motor control means for controlling a current supplied to said motor based on the vehicle speed and the steering torque in such a manner that the current supplied to said motor is zero when the vehicle speed is equal to or greater than a predetermined vehicle speed;

clutch control means for turning said clutch on and off based on the steering torque, the vehicle speed, the steering speed and the motor voltage in such a manner that said clutch is turned off to disconnect said motor from said steering system when a system failure is determined during high speed travel of the vehicle at which the vehicle is travelling at a speed equal to or higher than the predetermined vehicle speed.

2. A motor-driven power steering apparatus according to claim 1, wherein said clutch control means determines a system failure if the current flowing through said motor when deenergized is not equal to zero, or if the steering torque or a rate of change thereof is equal to or greater than a predetermined value and if the motor voltage across said motor when deenergized is equal to zero, or if the steering speed is equal to or greater than a predetermined value and if the motor voltage across said motor when deenergized is equal to zero.

3. A method of controlling a motor-driven power steering apparatus for a vehicle in which a motor is coupled via a clutch to a steering system having a steering wheel for generating an assisting torque to assist a steering motion of said steering system induced by a driver of the vehicle, said method comprising the steps of:

a) determining whether a speed of the vehicle is equal to or greater than a predetermined vehicle speed;

b) deenergizing said motor with said clutch held in a connected state when the vehicle speed is equal to or greater than the predetermined vehicle speed;

c) measuring the current flowing through the deenergized motor;

d) measuring the voltage across the deenergized motor;

e) measuring the steering torque and steering speed applied to the steering wheel by the driver;

f) determining whether there is a system failure on the basis of the motor current, motor voltage, steering torque and steering speed measurements of steps c), d) and e); and turning said clutch off to disconnect said motor from said steering system if there is a system failure.

4. A motor-driven power steering method according to claim 3, wherein the determination of a system failure is carried out by the steps of:

detecting whether the motor current flowing through said motor when deenergized is equal to zero;

detecting whether a steering motion is given to said steering wheel by the driver when the motor current across the motor when deenergized is equal to zero;

detecting whether the motor voltage across said motor when deenergized is equal to zero when a steering motion is given to said steering wheel by the driver; and determining a system failure if the motor current flowing through said deenergized motor is not equal to zero, or if the motor voltage across said motor when deenergized is equal to zero when a steering motion is given to said steering wheel by the driver and when the motor current flowing through said motor when deenergized is equal to zero.

5. A motor-driven steering method according to claim 4, wherein if the steering torque applied to said steering wheel by the driver or a rate of change thereof is equal to or greater than a predetermined torque, it is determined that a steering motion is given to said steering system.

6. A motor-driven steering method according to claim 4, wherein if a steering speed of said steering wheel is equal to or greater than a predetermined value, it is determined that a steering motion is given to said steering system.

* * * * *